United States Patent [19]

Chapman

[11] Patent Number: 5,138,516
[45] Date of Patent: Aug. 11, 1992

[54] FAULT SENSING AND DRIVING SYSTEM FOR OUTPUT DRIVER DEVICE

[75] Inventor: Brian Chapman, Gurnee, Ill.

[73] Assignee: Motorola, Inc., Schaumburg, Ill.

[21] Appl. No.: 498,884

[22] Filed: Mar. 26, 1990

[51] Int. Cl.$^5$ ............................................ H02H 7/10
[52] U.S. Cl. ...................................... 361/18; 361/86; 323/276
[58] Field of Search ............ 361/18, 42, 90, 91, 361/86, 42, 111, 56, 88; 363/55, 56; 323/274, 276, 281

[56] References Cited

U.S. PATENT DOCUMENTS

| | | | |
|---|---|---|---|
| 4,021,701 | 5/1977 | Davies | 361/18 |
| 4,322,770 | 3/1982 | Sendelweck | 361/91 |
| 4,441,136 | 4/1984 | Hampshire | 361/88 |
| 4,575,673 | 3/1986 | Tedeschi et al. | 361/88 |
| 4,979,066 | 12/1990 | Kawata et al. | 361/18 |

*Primary Examiner*—Todd E. DeBoer
*Attorney, Agent, or Firm*—John H. Moore

[57] ABSTRACT

A driver circuit (10), with a minimum number of interconnects between itself and a conventional output driver device (14), controls the normal on/off operation of the output driver device, and additionally senses various fault conditions within the output driver device. The driver circuit (10) also preferably shuts down the output driver device when the latter device begins to operate in a current limiting mode, and generates diagnostic signals which identify the type of fault condition that is sensed.

10 Claims, 1 Drawing Sheet

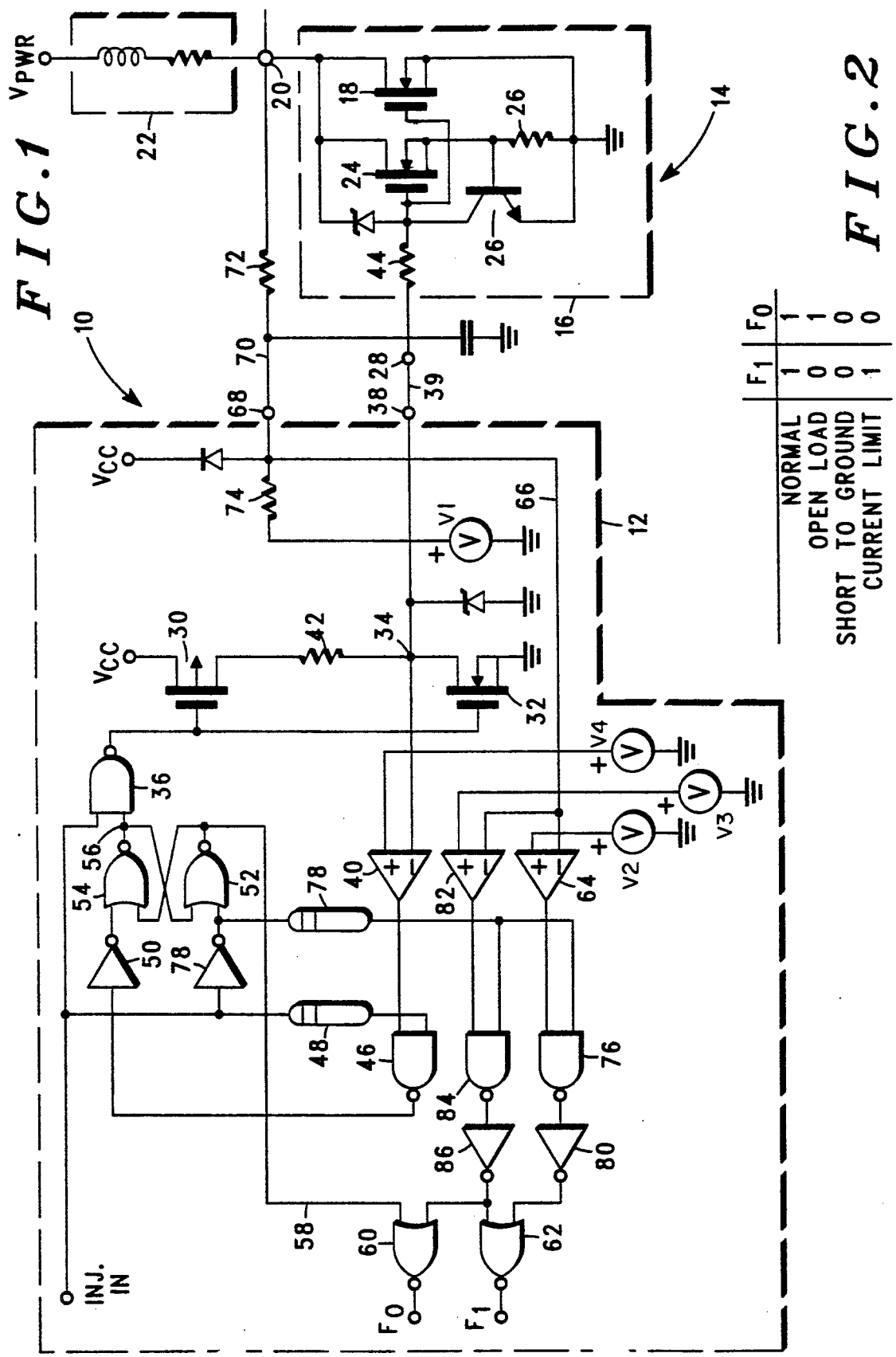

FAULT SENSING AND DRIVING SYSTEM FOR OUTPUT DRIVER DEVICE

FIELD OF THE INVENTION

Output driver devices of the type considered herein are typically 3-terminal devices that include a power output transistor and one or more internal transistors for limiting the current in the power output transistor when an over-current condition is sensed. The present invention is directed toward a system for controlling the operation of the output driver device, and for simultaneously sensing over-current and other fault conditions that can occur in the output driver device.

BACKGROUND OF THE INVENTION

Output driver devices of the type discussed above (sometimes referred to as "smart power" devices) may typically dissipate about one watt during normal operation. However, when an over-current condition begins to occur, the device reacts by going into a current limiting mode in which it may dissipate much more than one watt. The undesirable consequence of this is that the device may require the use of a heat sink because of the relatively high dissipation that can occur during the current limiting mode.

Conventionally, driver circuits are used to apply on-off signals to the output driver device. However, these drive circuits are presently incapable of adequately sensing fault conditions in the output driver device so that precautionary steps can be taken to prevent high levels of power dissipation, at least not without incurring too much expense and without using too many interconnects between the driver circuit and the output device.

OBJECTS OF THE INVENTION

It is a general object of the invention to provide a system in which an improved driver circuit operates with a conventional output driver device in such a way as to eliminate the need for a heat sink for the output driver device.

It is another object of the invention to provide such an improved driver circuit which uses a reduced number of terminals to interconnect with the output driver device, yet being capable of sensing multiple fault conditions within the output driver device.

BRIEF DESCRIPTION OF THE FIGURES

FIG. 1 is a schematic drawing showing a preferred driver circuit in accordance with the invention, and further showing how the driver circuit interconnects with a typical output driver device; and FIG. 2 is a table showing certain output signals developed by the driver circuit in response to different fault conditions that may occur in the output driver device. The illustrated signals may be used for diagnostic purposes.

DESCRIPTION OF THE PREFERRED EMBODIMENT

Referring to FIG. 1, a driver circuit 10 which is constructed in accordance with this invention is shown as being enclosed by a dashed line 12 in order to signify that the driver circuit 10 is preferably constructed as a part of a single integrated circuit chip. Broadly speaking, one function of the driver circuit 10 is to control the operation of an output driver device 14 (also shown enclosed by a dashed line 16 to indicate that it is also typically constructed as a single device). The driver circuit 10 additionally looks for certain fault conditions which might occur within the output driver device 14 and operates to shut the device 14 down in order to prevent it from operating in a condition in which it might dissipate excessive power. The driver circuit 10 also develops signals shown as F0 and F1 which may be used for diagnostic purposes and which identify the type of fault condition which the circuit 10 senses within the output driver device 14.

To help appreciate and understand the operation of the driver circuit 10, the output driver device 14 will first be discussed briefly.

The illustrated output driver device 14 is a conventional device that has an output power transistor 18 which is coupled between ground and an output terminal 20 which is typically connected to a load 22. Another transistor 24 is coupled in parallel with the transistor 18 and has a source resistor 26 across which a voltage is developed which is representative of the current carried by the output transistor 18. When that output current exceeds a preselected value, a further transistor 26 conducts in order to lower the voltage at the gates of transistors 18 and 24, thereby to limit (but not totally shut down) the current in the transistors 18 and 24. When the output driver device 14 goes into this current limiting mode, it tends to dissipate a much higher level of power than it does in its normal operating condition. This current limiting mode is one fault condition which is sensed by the driver circuit 10, as will be discussed later. The output driver device 14 also includes a gate drive terminal 28 whose purpose is to receive signals for turning the output transistor 18 off and on as desired.

Turning now to the driver circuit 10, a conventional aspect of it will be described first. As shown, the driver circuit 10 includes a pair of FET's (Field Effect Transistors) that are coupled between VCC and ground and in series with each other at a node 34. The gates of these transistors are connected together and to the output of a NAND gate 36 which receives an input identified as inj.in. This input is a logic one or logic zero signal whose purpose is to control the normal on and off time of the output driver device 14. Thus, turn-on of the output drive device 14 is accomplished by the gate 36 developing a low output (in response to the inj.in signal) which turns on the FET 30 and turns off the FET 32. This drives the voltage at node 34 high, and that relatively high level voltage is coupled to the driver circuit's input/output terminal 38. The latter terminal is coupled to the gate drive terminal 28 of the output driver device by a coupling line 39, thereby coupling a turn-on voltage to the gates of transistors 18 and 24 and causing the load 22 to be powered. To turn the output driver device off, the gate 36 drives the gates of transistors 30 and 32 high, thereby turning the transistor 30 off and turning the transistor 32 on. This pulls the voltage at node 34 to ground, thereby turning off the transistors 18 and 24 in the output driver device 14.

In order to sense when the output driver device 14 begins operating in a high current fault condition (i.e., the current limiting mode in which the transistor 26 is on), the driver circuit 10 includes sensing means, including a comparator 40, that is coupled to the input/output terminal 38 as well as to the drive control circuitry (including FETs 30 and 32). As will now be described, this sensing means causes the drive control circuitry to turn the output driver device 14 off upon detecting that the latter device is in a current limiting mode. For this purpose, there is also included a resistor 42 that is coupled in series between the FET's 30 and 32 as shown, one end thereof being connected to the node 34. One input to the comparator 40 is also coupled to the node 34 and to the input/output terminal 38. The other input to the comparator 40 is received from a DC voltage source V4, the value of which is selected to be lower than the voltage normally found on the input/output terminal 38 when the output driver device 14 is operating normally.

The sensing means operates as follows. Assume first that the transistor 18 is on and operating normally. If a short should then occur between the output terminal 20 and the power supply (Vpwr), the transistor 18 would begin conducting at a level of current which would be high enough to cause the transistor 26 to turn-on. Conduction by the transistor 26 results in a flow of current through the resistor 42 and terminals 38 and 28, and from there through a resistance 44 to the collector of the transistor 26. This results in a voltage drop across the resistor 42, thereby lowering the value of the voltage at the input/output terminal 38. If that lowered voltage is lower than the value of the reference voltage V4, then the comparator 40 generates a high output which is applied to one input of a NAND gate 46. The other input to the NAND gate 46 is received from a delay circuit 48 which generates a high level output approximately ten microseconds after receiving an input from the inj.in input. This delay is included to ensure that the transistor 18 has had a chance to become fully conductive before attempting to turn it off, thereby to avoid a cycle of fast turn on and turn off.

After the delay, the output of the gate 46 goes low, and that output is converted to a high level signal by an inverter 50, the output of which is coupled to one input of a latch comprising NOR gates 52 and 54. This latch responds by generating a low level signal on a lead 56 which is coupled to an input of gate 36, the result of which is that the output of the gate 36 turns the FET 30 off and the FET 32 on. Consequently, the low level signal now coupled to the output driver device 14 via terminals 38 and 28 turns the output device off. Therefore, rather than the output driver device 14 operating in a high power mode while the current limiting situation continues, the driver circuit 10 turns off the output driver device 14, thereby permitting the device 14 to operate without a heat sink (assuming of course that no heat sink is required during normal operation of the device 14). The output driver device 14 remains off until the next cycle of operation in which a new pulse is received at the inj.in input for again turning on the output driver device 14. If the short has then been removed across the load 22, the output driver device 14 will operate normally. If not, the sensing means within the driver circuit 10 will again turn the output driver device off until the next cycle of operation occurs.

Another feature of the driver circuit 10 is the generation of a diagnostic signal which can be used to indicate what kind of problem the output driver device 14 is experiencing. As mentioned previously, the existence of the current limiting mode in the output driver device 14 resulted in a low level signal being generated on lead 56 by the latch comprising gates 52 and 54. The other output from this latch is a relatively high level signal on a lead 58 that is coupled to one input of a NOR gate 60, the output (F0) of which is now driven low. Another output F1 from a NOR gate 62 is now at a high level, thus generating the logic levels shown for F1 and F0 in FIG. 2 to signify that the output device 14 is in the current limiting condition. The signals F1 and F0 may be used for diagnostic or alarm purposes, as required by the particular application of this invention.

Another fault condition that can be sensed by the driver circuit 10 is the "open load" condition. This condition occurs when an open occurs in the load 22, or whenever a discontinuity occurs between the output terminal 20 and Vpwr.

To sense the open load condition, the driver circuit 10 includes additional sensing means in the form of a comparator 64, one input of which receives a DC reference voltage from a DC source V2. The other input to the comparator 64 is received via a line 66 that is coupled to a load sense terminal 68. This terminal is coupled via a coupling line 70 and a resistor 72 to the output terminal 20. Also coupled to the load sense terminal 68 is another reference voltage source V1 that couples to the load sense terminal 68 through another resistance 74.

Open load sensing occurs as follows. With the output driver device 14 turned off, the transistors 18 and 24 will be nonconductive. In that situation, the voltage at the output terminal 20 should normally be at or near Vpwr. However, if the load 22 is open, or any other discontinuity exists between the output terminal 20 and Vpwr, Vpwr will be disconnected from the output terminal 20. Instead, the voltage at the output terminal 20, and the voltage at the load sense terminal 68, will be determined by the voltage source V1. If the voltage which is now present at the load sense terminal 68 is less than the value of the reference voltage V2, then the comparator 64 will generate a high level output which will be coupled to one input of a NAND gate 76. The other input to this NAND gate comes from a delay circuit 78 which will produce a logic high output, in response to a signal at inj.in that is coupled through an inverter 78, roughly ten microseconds after the initiation of the inj.in signal. When both inputs to the NAND gate 76 are high, its output goes low and is converted to another high output by an inverter 80, which high output is coupled to one input of the NOR gate 62. With this arrangement, the signal F1 is driven low, while the signal F0 remains high, assuming that an open load is the only fault condition that is being sensed. See FIG. 2.

The other fault condition which is sensed by the driver circuit 10 is a short to ground. In this condition, the output terminal 20 of the output driver device 14 is shorted to ground so that essentially a ground potential appears at the output terminal 20. Normally, of course, the voltage at the output terminal 20 will be at or near Vpwr when the transistors 18 and 24 are off. When a short to ground occurs at the output terminal 20, the voltage at the load sense terminal 68 will drop to one-half of the value of V1 (which is coupled to the load sense terminal 68 via the resistor 74). This situation is detected by the additional sensing means which also includes another comparator 82. One input to this comparator is received from another reference voltage source V3 while the other input thereto is received from the load sense terminal 68 via the line 66. Thus, when the voltage at the load sense terminal drops to a fraction (e.g. one-half) of the value of V1, which is less than the value of the reference voltage V3, the comparator 82 generates a high level output which is coupled to one input of another NAND gate 84. The low level output from the gate 84 is converted to a high level signal by an inverter 86 which drives one input to the gate 62 and another input to the gate 60. Thus, when a short to ground occurs at the output terminal 20, this condition is detected by sensing that the voltage at the load terminal 68 has dropped below the value of the reference voltage V3, whereupon the comparator 82 fires to ultimately produce logic zeros at F0 and F1 (see FIG. 2).

It can be seen from the foregoing description that the invention can eliminate the need for a heat sink on the output device 14 (assuming that no heat sink is otherwise needed except during current limiting). In addition, the other fault conditions (short to ground, open load) are also sensed and a signal identifying the sensed fault condition is produced, all with a minimum number of terminals on the driver circuit 10 and a minimum number of interconnects to the output device 14.

Although the invention has been described in terms of a preferred embodiment, it will be obvious to those skilled in the art that many alternations and modifications may be made without departing from the invention. Accordingly, it is intended that all such alterations and modifications be considered as within the spirit and scope of the invention as defined by the appended claims.

What is claimed is:

1. A fault sensing and driving system for use with an output driver device that has internal current limiting capabilities, a gate-drive terminal, and an output terminal for connection to a load, the system comprising:
    a logic circuit having an input/output terminal;
    coupling means for coupling the logic circuit's input-/output terminal to the gate-drive terminal of the output driver device,
    the logic circuit including drive control circuitry coupled to the input/output terminal for sending a control signal to the output driver device via said coupling means for turning the output driver device off and on in a normal operating mode,
    the logic circuit further including sensing means coupled to the input/output terminal and to the output driver device via said coupling means for sensing a current limiting condition in the output driver device, the sensing means also being coupled to the logic circuit's drive control circuitry for causing the drive control circuitry to turn off the output driver device when a current limiting condition is sensed,
    whereby the logic circuit can, using only one of its terminals and one terminal on the output driver device, control the normal operation of the output driver device, sense a current limiting condition in the output driver device, and shut the output driver device down during current limiting to reduce power consumption.

2. A system as set forth in claim 1 wherein the logic circuit further includes a fault signalling circuit, responsive to the sensing means, for generating a signal that is indicative of the current limiting condition.

3. A system as set forth in claim 1 wherein the sensing means includes:
    means generating a first reference signal;
    a comparator receiving the first reference signal and being coupled to the input/output terminal for receiving a fault signal indicative of current limiting in the output driver device, and for comparing the fault signal to the first reference signal.

4. A system as set forth in claim 3 wherein the drive control circuitry includes an impedance coupled to the input/output terminal such that, when a current limiting condition occurs in the output driver device, a voltage drop occurs across the impedance for lowering the signal level at the input/output terminal, which lowered signal level constitutes the fault signal received by the comparator for generating an indication of the current limiting condition.

5. A system as set forth in claim 1 wherein the logic circuit includes a load sensing terminal, wherein the load sensing terminal is coupled to the output terminal of the output driver device, and wherein the logic circuit includes additional sensing means coupled to the load sensing terminal for sensing the presence of a fault condition in the output driver device.

6. A system as set forth in claim 5 wherein the logic circuit includes a fault signalling circuit responsive to the sensing means and to the additional sensing means for generating a signal that is indicative of the type of fault condition that is sensed.

7. A system as set forth in claim 6 wherein the additional sensing means includes:
    a voltage source coupled to the load sense terminal so as to impose a reference voltage on the input/output terminal when the load is decoupled from the output terminal of the output driver device; and
    a comparator coupled to the load sense terminal for comparing the voltage at said load sense terminal to a predetermined reference level.

8. A system as set forth in claim 7 wherein the additional sensing means also includes:
    a second comparator coupled to the load sense terminal for comparing the voltage at said terminal to a further predetermined reference level for sensing when the output terminal is shorted to ground.

9. A driver circuit for use with an output driver device that has internal current limiting capabilities, a gate-drive terminal, and an output terminal for connection to a load, the driver circuit comprising:
    an input/output terminal for connection to the gate-drive terminal of the output driver device;
    a load-sensing terminal for connection to the output terminal of the output driver device;
    drive control circuitry coupled to the input/output terminal for sending a control signal to the output driver device via said input/output terminal for turning the output driver device off and on in a normal operating mode;
    first sensing means coupled to the input/output terminal for sensing a current limiting condition in the output driver device via the input/output terminal, the first sensing means also being coupled to the drive control circuitry for causing the drive control circuitry to turn off the output driver device when a current limiting condition is sensed;
    additional sensing means coupled to the load sensing terminal for sensing the presence of a fault condition in the output driver device; and
    a fault signalling circuit, responsive to the first sensing means and to the additional sensing means, for generating a signal that is indicative of a sensed condition.

10. A driver circuit as set forth in claim 9 wherein the additional sensing means includes:
    means for developing, at the load-sensing terminal, a fault signal that differs from a predetermined reference value in response to an open condition in the load, and that differs from a different predetermined reference value in response to the output terminal being shorted to ground; and
    means for sensing differences between the fault signal and the predetermined reference values.

* * * * *